United States Patent
Boehme et al.

(10) Patent No.: US 6,512,670 B1
(45) Date of Patent: Jan. 28, 2003

(54) DETACHABLE DISPLAYS OR PORTABLE DEVICES

(75) Inventors: Richard A. Boehme, Kent Lakes, NY (US); David A. Epstein, Ossining, NY (US); Paul M. Matchen, Pleasantville, NY (US); William A. Nagy, New York, NY (US); Roger L. Phillips, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 09/679,385

(22) Filed: Oct. 5, 2000

(51) Int. Cl.[7] .............................. H05K 7/10; H05K 7/00; H05K 7/16
(52) U.S. Cl. ...................... 361/681; 361/683; 361/686; 312/223.2
(58) Field of Search ...................... 361/683, 680–682, 361/686; 348/790, 794; 312/223.2, 223.3

(56) References Cited

U.S. PATENT DOCUMENTS

| | | | | |
|---|---|---|---|---|
| 4,749,364 A | * | 6/1988 | Arney et al. ................ 361/681 |
| 5,001,659 A | * | 3/1991 | Watabe ........................ 16/221 |
| 5,233,502 A | * | 8/1993 | Beatty et al. ............... 248/558 |
| 5,253,139 A | * | 10/1993 | Satou .......................... 292/300 |
| 5,583,529 A | * | 12/1996 | Satou .......................... 345/87 |
| 5,659,361 A | * | 8/1997 | Jin .............................. 248/921 |
| 5,745,340 A | * | 4/1998 | Landau ........................ 345/1.1 |
| 5,790,193 A | * | 8/1998 | Ohmori ....................... 348/233 |
| 5,796,576 A | * | 8/1998 | Kim ............................. 16/259 |
| 5,805,415 A | * | 9/1998 | Tran et al. .................. 248/918 |
| 5,949,565 A | * | 9/1999 | Ishida ......................... 359/152 |
| 6,310,768 B1 | * | 10/2001 | Kung et al. ............. 312/223.1 |
| 6,317,315 B1 | * | 11/2001 | Lee et al. .................... 16/254 |

FOREIGN PATENT DOCUMENTS

| | | | | |
|---|---|---|---|---|
| DE | 3930648 A1 | * | 5/1990 | ............ G06F/1/16 |
| DE | 20107232 U1 | * | 6/2001 | ............ H04M/1/02 |
| GB | 2331422 A | * | 5/1999 | .......... H04N/5/225 |
| JP | 8-205016 A | * | 8/1996 | .......... H04N/5/232 |

* cited by examiner

Primary Examiner—Anatoly Vortman
(74) Attorney, Agent, or Firm—Whitham, Curtis & Christofferson, P.C.; Stephen C. Kaufman

(57) ABSTRACT

A detachable display unit for portable devices is field replaceable and can be interchanged rapidly for service, upgrade or more flexible use. The display is a simple field replaceable unit that can be replaced in a matter of a few seconds in a routine way, allowing more cost effective service both for the repair organization and the consumer. This is made possible by a set of electrical interfaces and connectors for portable devices such that high cost and fragile displays can be quickly changed in the field by the consumer. The specific sets of interfaces and connectors for different classes of portable devices utilize as much as possible common electrical and physical components, thereby standardizing the electrical interfaces and connectors.

11 Claims, 9 Drawing Sheets

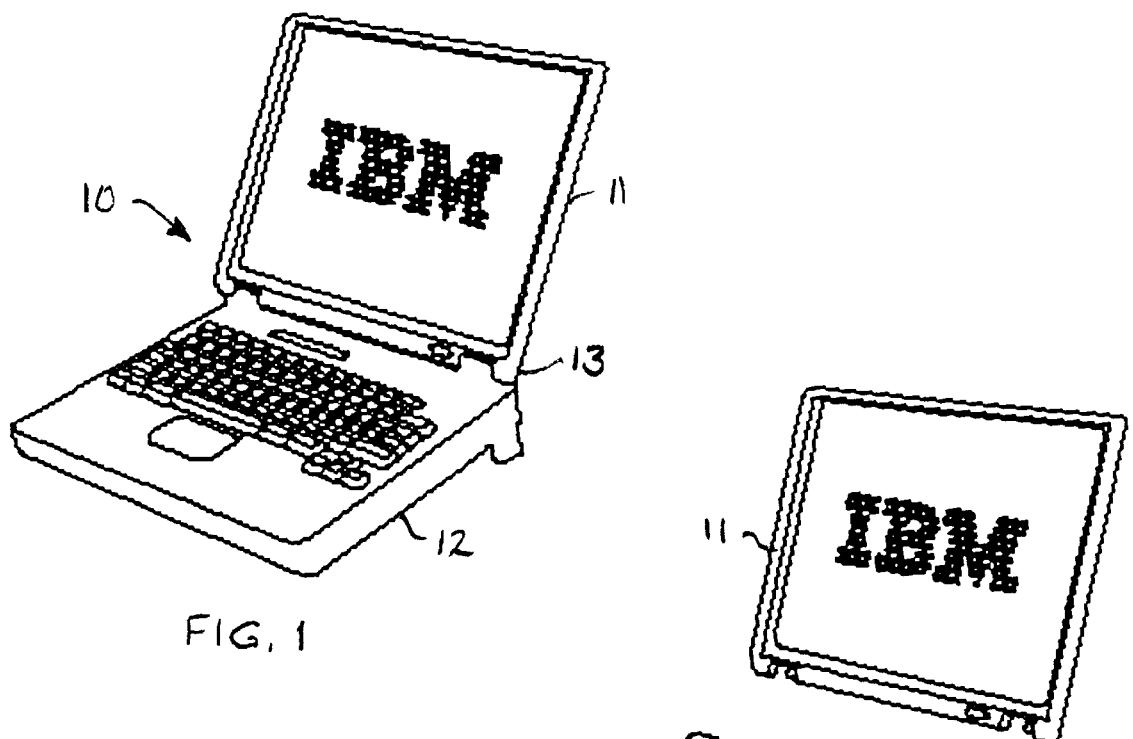
FIG. 1
FIG. 2
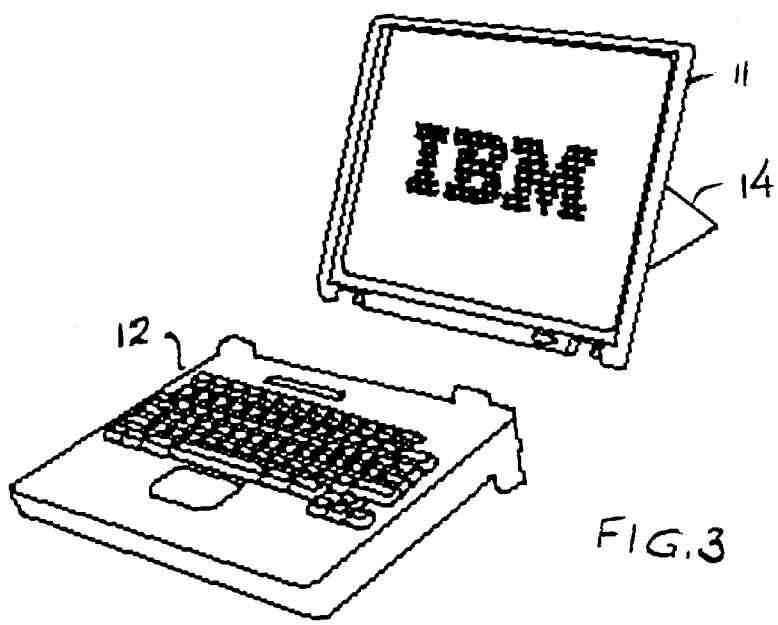
FIG. 3

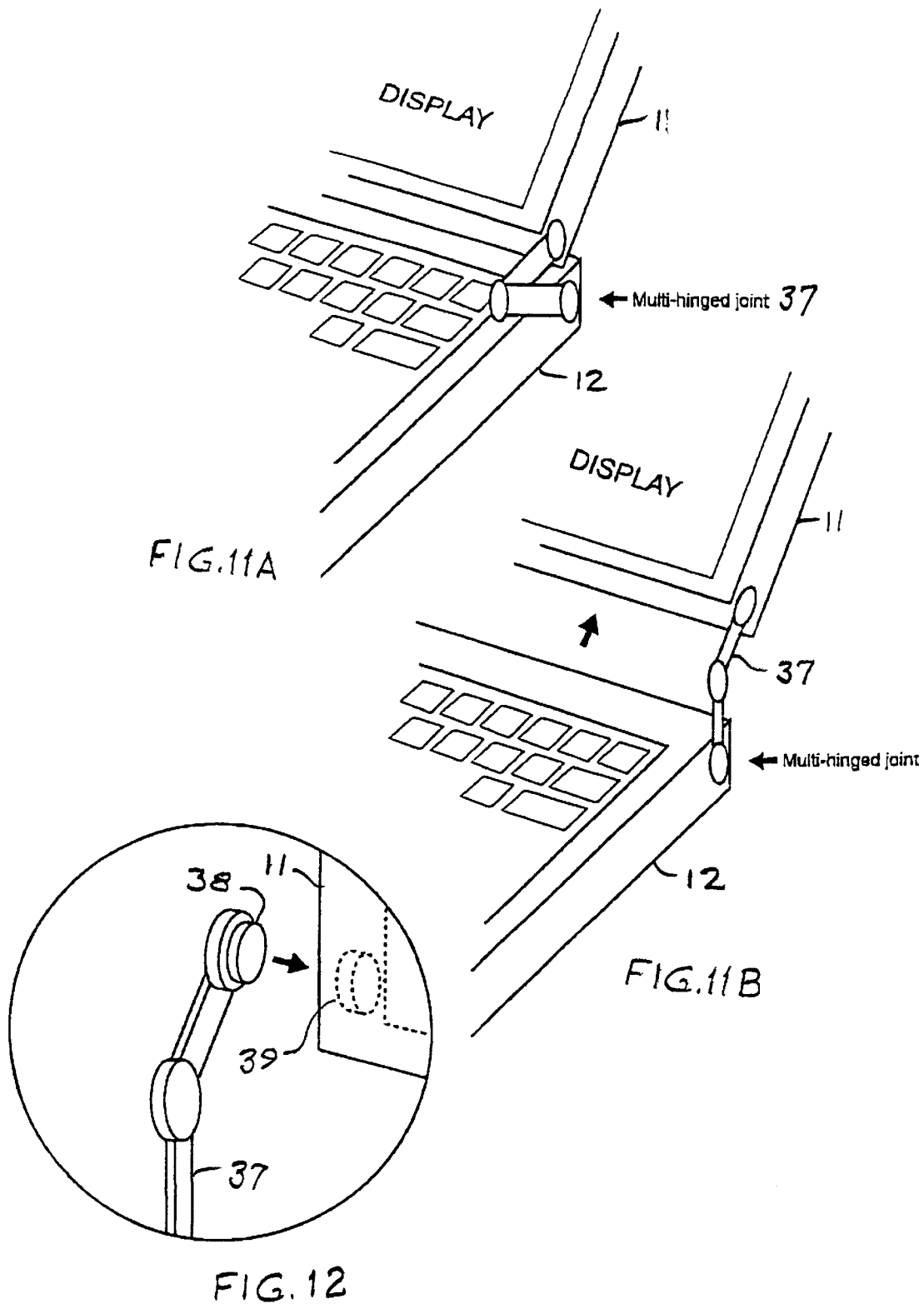

DETACHABLE DISPLAYS OR PORTABLE DEVICES

BACKGROUND OF THE INVENTION

1. Field of the Invention

The present invention generally relates to displays for portable devices, such as lap top computers, camcorders, portable video devices such as DVD players, and the like, and, more particularly, to detachable displays for such devices.

2. Background Description

Laptop computers and other portable devices use displays that are permanently installed at the manufacturing site and are serviceable only by returning the device to a service center. The permanent nature of this installation causes increased cost and complexity of service and prevents field service of the display and of the device, makes the device unavailable to the consumer during display repair, and prevents the device from being upgraded to a higher resolution display.

SUMMARY OF THE INVENTION

It is therefore an object of the present invention to provide a display unit for portable devices which is field replaceable and can be interchanged rapidly.

According to the invention, the display is a simple field replaceable unit that can be replaced in a matter of a few seconds in a routine way, allowing more cost effective service both for the repair organization and the consumer. In addition, consumers are provided additional flexibility in the management of expensive portable devices and, therefore, a marketing advantage to businesses manufacturing portable devices with the detachable display of the present invention.

The invention is made possible by a set of electrical interfaces and connectors for portable devices such that high cost and fragile displays can be quickly changed in the field by the consumer. The specific sets of interfaces and connectors for different classes of portable devices utilize as much as possible common electrical and physical components, thereby standardizing the electrical interfaces and connectors.

There are many advantages to the invention. Among these are the following:

1. The display becomes a consumer field replaceable unit, lowering cost and time to service.
2. The device (e.g., laptop computer, camcorder, portable video device such as a DVD player, etc.) remains useful to the consumer while the display repair is arranged and a new display is shipped.
3. The display can be field upgraded, extending the useful life of the device and providing additional sales channel for displays.
4. Costly high resolution displays need not be permanently fixed to a single device but can be shared among a group of users and, potentially, between devices. Lower resolution, less costly displays can be used for routine work, and the high resolution display can be used for work requiring the increased resolution; in other words, displays can be interchanged as needed.
5. The ability to market high price displays independent of the base device increases the likelihood that a consumer will purchase some high cost displays since they can be shared and provides an additional mode for price segmentation in portable device markets.
6. In the case of a display for a laptop computer, the display can be removed and used as a traditional monitor for the laptop computer or a desktop computer via a cable connection, allowing the consumer flexibility in the use and placement of the display. Conversely, when the detachable display is removed (say, for service) from a laptop computer or portable video device such as a DVD player, the laptop computer or a DVD player can still be used by the consumer by connecting to a standard cathode ray tube (CRT) monitor, or when the detachable display is removed from a camcorder, the camcorder can still be used by viewing a scene through the conventional eye piece.
7. The device, such as a laptop computer, camcorder or portable video device such as a DVD player, can be sold without the display and the display sold separately, allowing the consumer more flexibility of choice of computer, camcorder or portable video device such as a DVD player and display.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is pictorial representation of a laptop computer with the detachable display according to the invention attached to the computer;

FIG. 2 is a pictorial representation of the laptop computer of FIG. 1 with the display detached;

FIG. 3 is a pictorial representation of the laptop computer of FIGS. 1 and 2 showing the detached display supported by a fold out support;

FIGS. 11A and 11B are a pictorial representations of a multi-hinged joint for mechanically connecting the display to the computer;

FIG. 12 is an enlarged view of the multi-hinged joint shown in FIGS. 11A and 11B showing how the display may be detached from the computer;

DETAILED DESCRIPTION OF A PREFERRED EMBODIMENT OF THE INVENTION

Figure 4A:
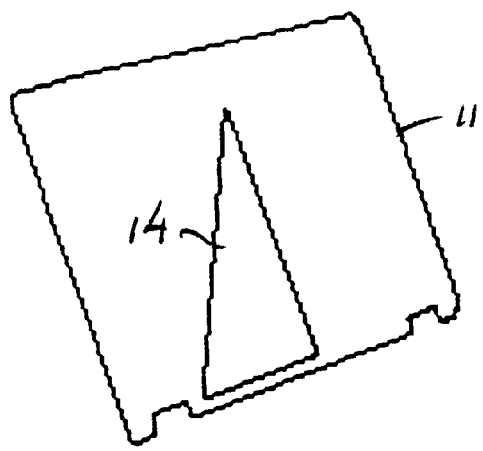
FIGS. 4A, 4B and 4C respectively show the back of the detachable display with the fold out support member folded against the back of the display, folded out from the back of the display, and supporting the display.

The invention will be described first in the context of laptop computers, such as IBM Thinkpad® computers, but those skilled in the art will recognize that the invention is not limited to this type of device. Besides laptop computers, there are a growing number of portable devices ranging from hand held computers and communicators to camcorders and video display devices which use fold up or fold out displays, typically liquid crystal displays (LCDs), to which the invention may be applied. In fact, within the limits of the requirements of the specific portable device, the invention provides a standardized set of electrical and physical elements for the electrical interfaces and connectors of the detachable display for those devices, allowing each field replacement of the detachable displays by the consumer.

Referring now to the drawings, and more particularly to FIG. 1, there is shown a laptop computer 10, such as the IBM Thinkpad® computer, of generally conventional appearance and comprising a display 11 attached to central processing unit (CPU) 12 at a hinged connector 13. The display 11 is, according to the present invention, detachable from the CPU 12, as shown in FIG. 2. While the detachable feature of the display 11 facilitates the possibility of having the display serviced, there are many other advantages, as enumerated above, to detaching the display. For example, the computer can be easily upgraded by substituting a higher resolution display or, in the alternative, substituting a CPU having a faster microprocessor or larger storage device. Besides the possibility of service or upgrade, the consumer might simply want to position the display away from the CPU in a way that is more comfortable to the consumer. This is shown in FIG. 3 where, it will be observed, the display 11 is being supported by a fold out support member 14. The electrical communications between the display 11 and the CPU 12 may be wireless or wired, as with a cable (not shown) supplied for the purpose. The display 11 is not confined to be used with the CPU 12 to which it was originally attached and could be used, for example, with a desktop computer or another, different laptop CPU.

Figure 4B:
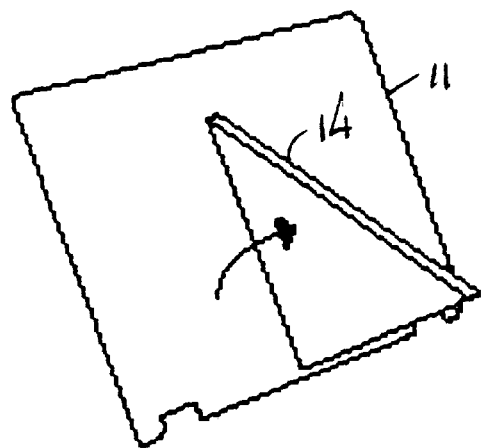
Figure 4C:
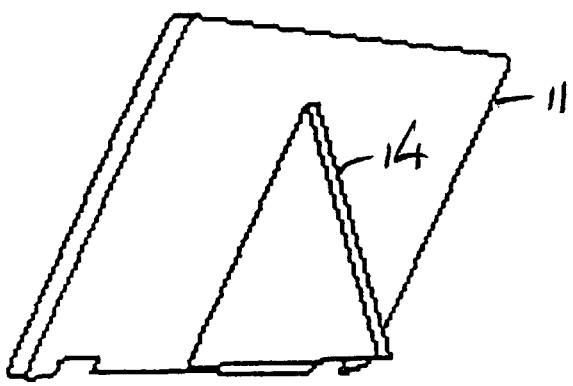

FIGS. 4A, 4B and 4C illustrate the back of the display 11 showing the manner in which the support member 14 is attached and deployed. The support member 14 is similar in form and function to those commonly found on photograph picture frames, allowing the picture frame to be stood on a horizontal flat surface, such as a desk. In FIG. 4A, the support member 14 is folded flat against the back of the detached display 11. The hinge mechanism may be provided with a spring bias that holds the support member against the back of the display in this position. Alternatively, an attaching member (not shown), such as a hook and loop strap material, may be used to hold the support member 14 tightly against the back of the display. In FIG. 4B, the support member 14 is folded out, away from the back of the detached display 11. When in this position, a spring bias may be provided in the hinge mechanism to hold the support in its folded out position. Alternatively, a retaining member (not shown) may be used to hold the support member 14 in its folded out position. The display 11 may then be positioned on a horizontal flat surface supported by the support member 14 and the base of the display, as shown in FIG. 4C.

Figure 5:
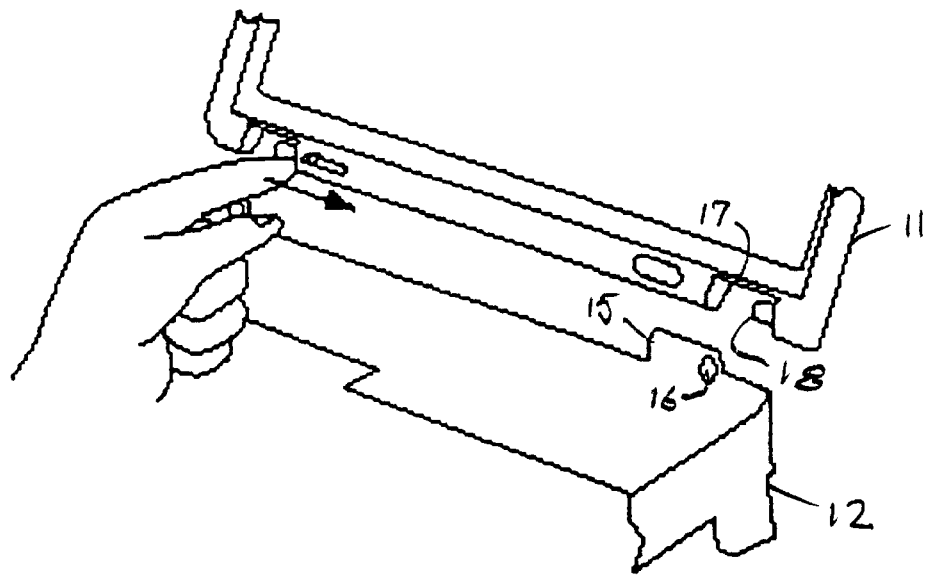
FIG. 5 is a pictorial representation of the physical connector structure for attaching the display to the laptop computer.

FIG. 5 shows the physical detachable hinge mechanism used to attach the display 11 to the CPU 12 and to detach the display 11 from the CPU 12. Looking first at the hinge mechanism on the right side of the CPU and display, the CPU is provided with a cylindrical barrel 15 having an opening 16. The barrel 15 mates with a corresponding slot 17 into which a hinge pin 18 projects. The hinge pin 18 retracts to allow the barrel 15 to fit into the slot 17, and when in position, the hinge pin 18 is then allowed to project into the opening 16, completing the physical hinge connection. A similar physical connection is made at the left side of the display and CPU.

Figure 6:
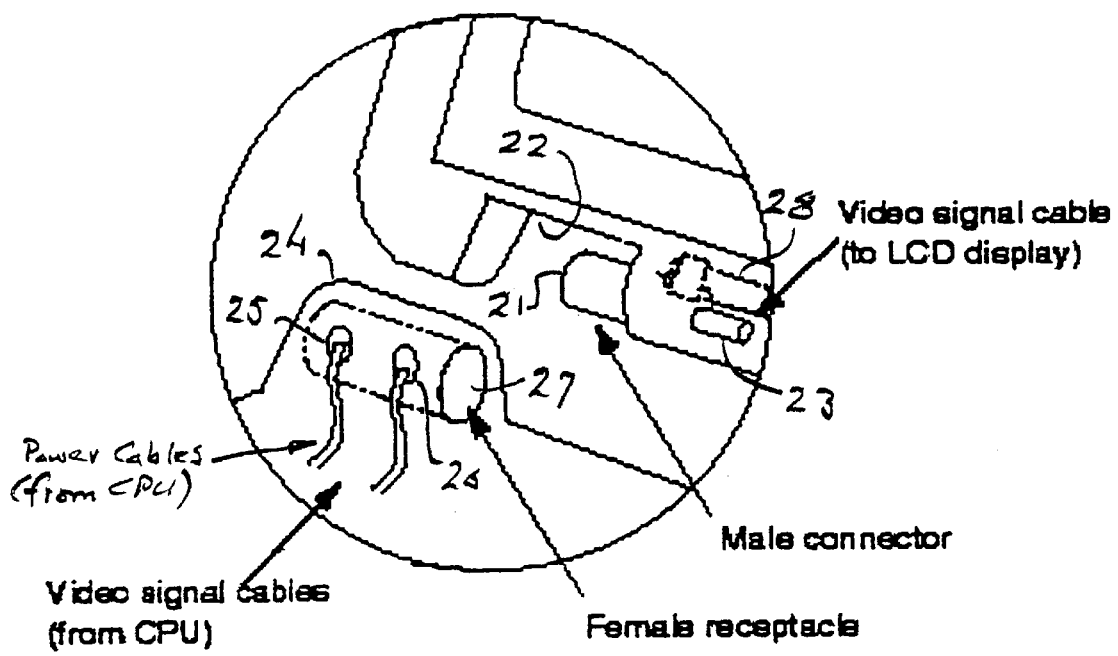
FIG. 6 is an enlarged view of the left connector structure showing the electrical interface between the computer and the display in phantom view.

FIG. 6 shows in more detail the left side hinge mechanism which, while physically similar to the right side mechanism, this mechanism also includes the electrical interface providing both electrical power and video signal connections between the CPU 12 and the display 11. The retractable hinge pin 21 within the slot 22 is manually moved to its retracted position by a sliding toggle 23. This toggle 23 is mechanically connected (not shown) to retract hinge pin 18 simultaneously with the retraction of hinge pin 21. The barrel 24 of the hinge on the CPU 12 includes within its interior electrical connectors 25 and 26 for electrical power and video signals, respectively. The mating hinge pin 21 includes mating electrical connectors such that, when the hinge pin 21 extends into the opening 27 of the barrel 24, electrical connections are established for both electrical power and video signals between the CPU 12 and the detachable display 11. The connectors on the hinge pin 21 are connected to internal electrical wiring 28 of the display 11.

Figure 7:
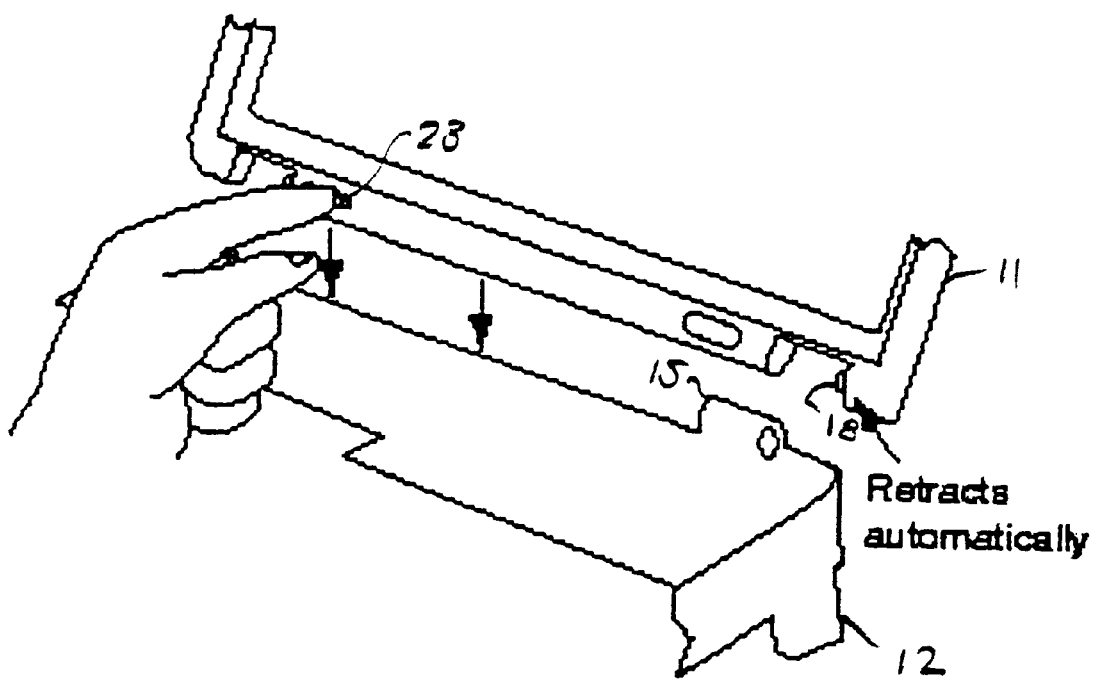
FIG. 7 is a pictorial representation of the connector structure of FIG. 5 being actuated by a consumer in preparation for attaching the display to the computer.
Figure 8:
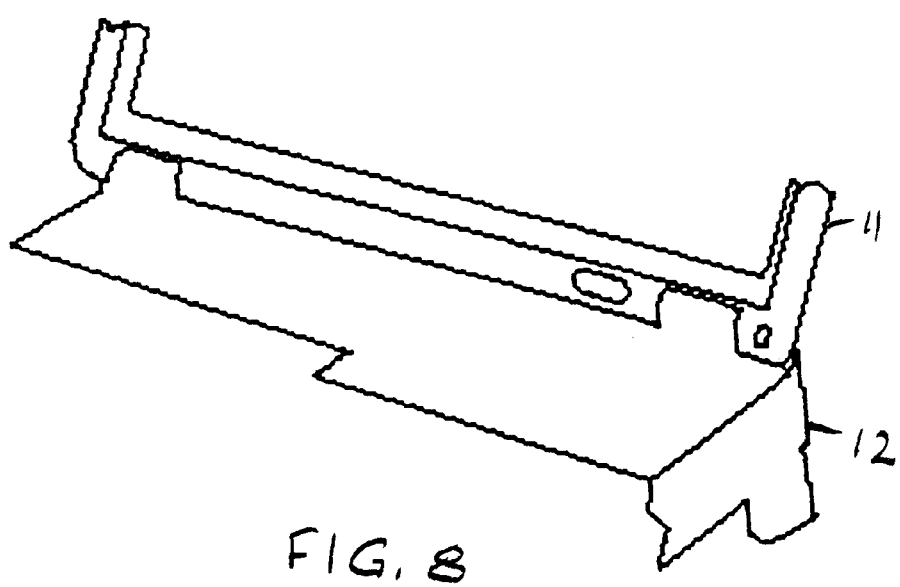
FIG. 8 is a pictorial representation of the connector structure of FIGS. 5 and 7 showing the display attached to the computer.

FIG. 7 shows the consumer actuating the sliding toggle 23 causing to both hinge pins 18 and 21 to retract, allowing the display 11 to be attached to the CPU 12. When the hinge barrels 15 and 24 are within the slots 17 and 22, respectively, the sliding toggle 23 is released, allowing the corresponding hinge pins to extend into hinge barrels 15 and 24 to complete the mechanical connections between the display and the CPU. As described with reference to FIG. 6, electrical connections are also established between the display and the CPU. The display 11 is detached from the CPU 12 by the reverse process; that is, the sliding toggle 23 is moved to the right to retract the hinge pins, and then the display is simply and easily removed from the CPU.

Figure 9:
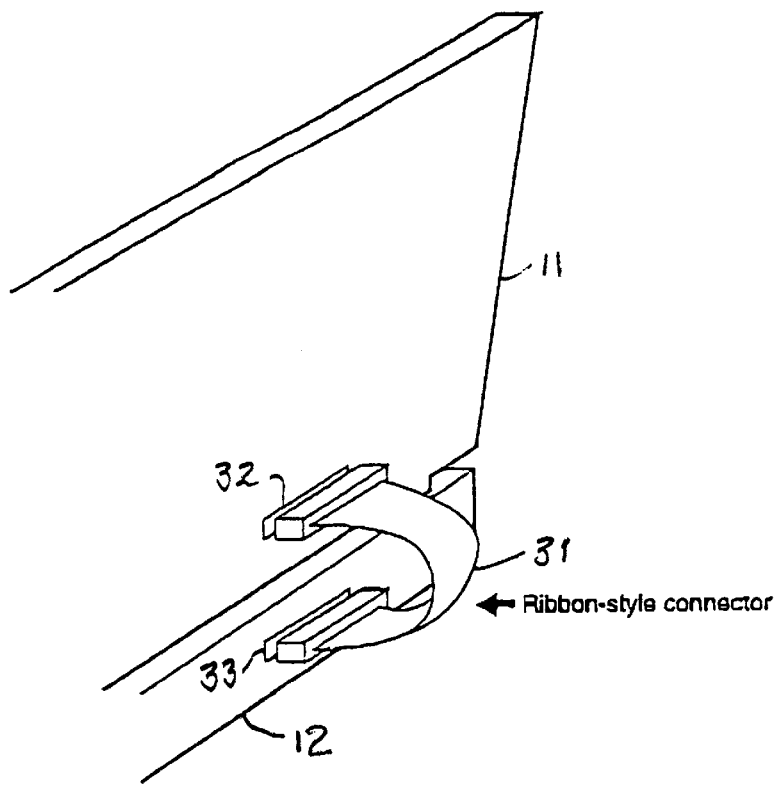
FIG. 9 is a pictorial representation of a ribbon-style connector used for making electrical connections between the display and the computer.

FIG. 9 is a pictorial representation of an alternative electrical connection between the display 11 and the CPU 12. In this embodiment, a ribbon-style cable 31 is used for making electrical connections between the display and the computer. The cable 31 is plugged into connectors 32 and 33 for the purpose. This embodiment can be combined with the embodiment shown, for example, in FIG. 6 to allow the user the option of using the detachable display without the ribbon cable when the display is mechanically attached to the computer and also to allow the user to use the display detached from the computer. In other words, this embodiment allows the user to detach the display from the computer but still use the display. The user can place the display at a position or location which is more to the user's preference.

Figure 10:
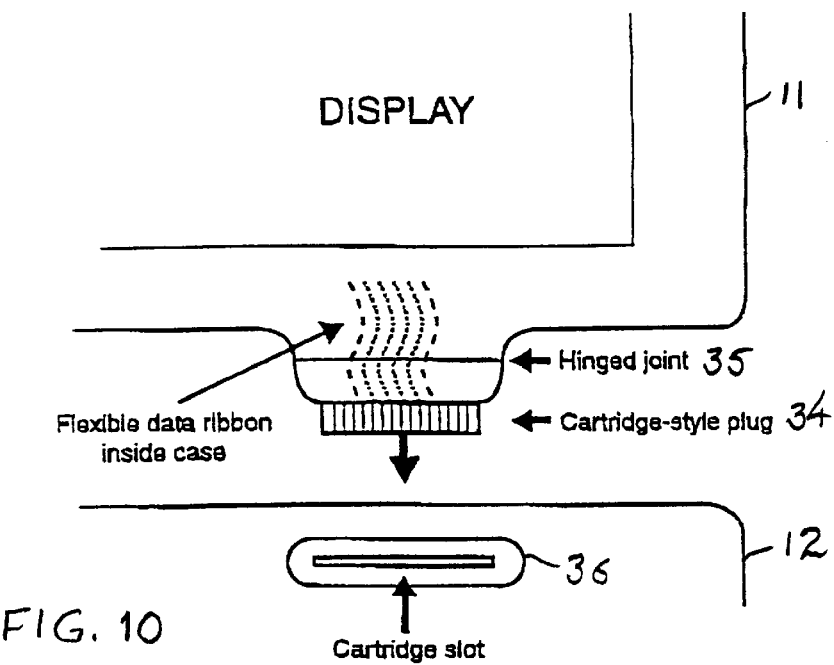
FIG. 10 is a pictorial representation of a hinged cartridge-type connector used for making electrical connections between the display and the computer.

FIG. 10 shows yet another embodiment of making the electrical connection between the display 11 and the CPU 12. In this embodiment, a hinged cartridge-type connector 34 used for making electrical connections between the display and the computer. The connector is attached to the display 11 and hinged along line 35. A mating cartridge slot 36 is provided in the computer. When the connector 34 is inserted in the cartridge slot 36, the user can adjust the angle of the display to his or her preference due to the hinged connector.

FIGS. 11A and 11B show an alternative embodiment for the mechanical connection of the display 11 to the computer 12. This is a multi-hinged joint 37 for mechanically connecting the display to the computer. In FIG. 11A, the multi-hinged joint 37 is in a "closed" position with the display closest to the computer. The multi-hinged joint 37 may be "opened" or extended as shown in FIG. 11B to allow the user to adjust the display with respect to the computer both in angle and distance from the computer. FIG. 12 is an enlarged view of the multi-hinged joint showing how the joint may be detached from the computer. At the distal end of the joint is an extending cylindrical fitting 38 which mates with a corresponding recess 39 in the side edge of the display 11. The fitting 38 may be snapped into or out of engagement of the recess 39, allowing connection of disconnection of the display and the computer.

Figure 13:
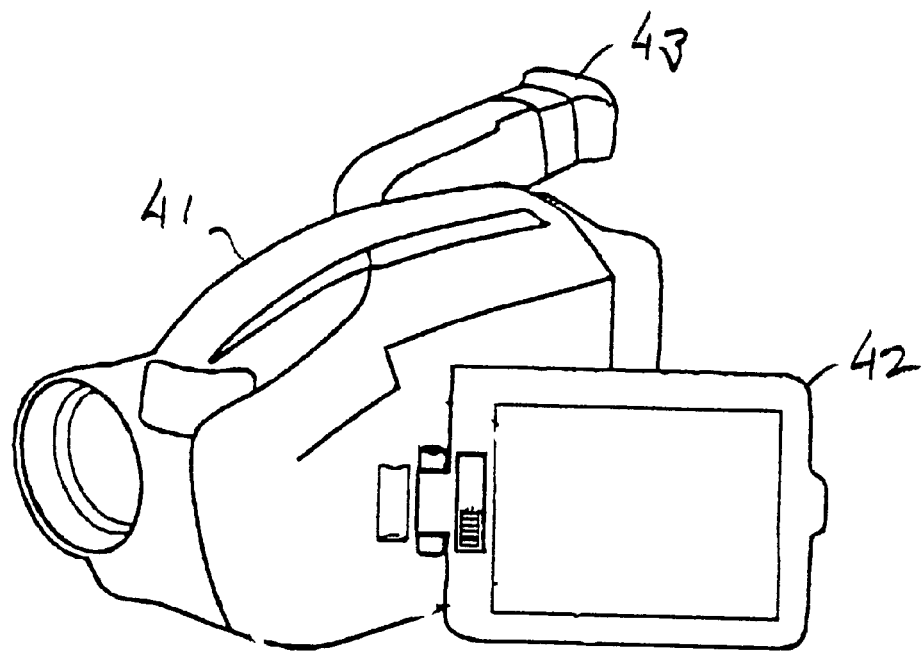
FIG. 13 is a pictorial representation of a camcorder with a detachable display according to the invention.

As mentioned, the invention is not limited to laptop computers and may be advantageously applied to any number of consumer appliances which use LCD or similar displays. FIG. 13 illustrates an example of a camcorder 41 with a detachable display 42 according to the invention. Display 42 is an alternative display to the through-the-lens view finder 43. When the view finder 43 is being used, the display 42 is folded against the body of the camcorder 41 and the power to the display is turned off to conserve battery power. However, should the display 42 need to be serviced, the user can still use the camcorder because the display 42 can be detached for servicing and the camcorder can be used with the view finder 43.

Figure 13A:
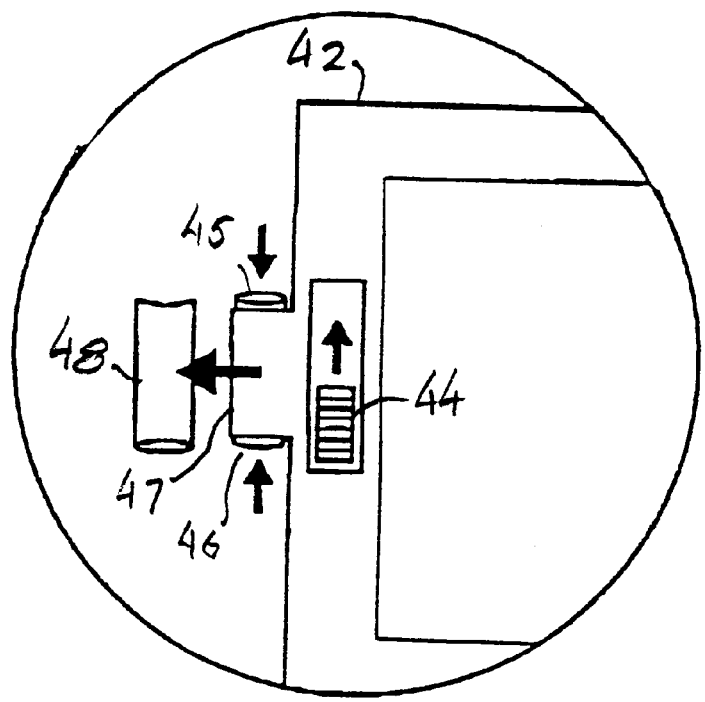
FIG. 13A is an enlarged view of the mechanism by which the detachable display is attached to the camcorder.
Figure 15:
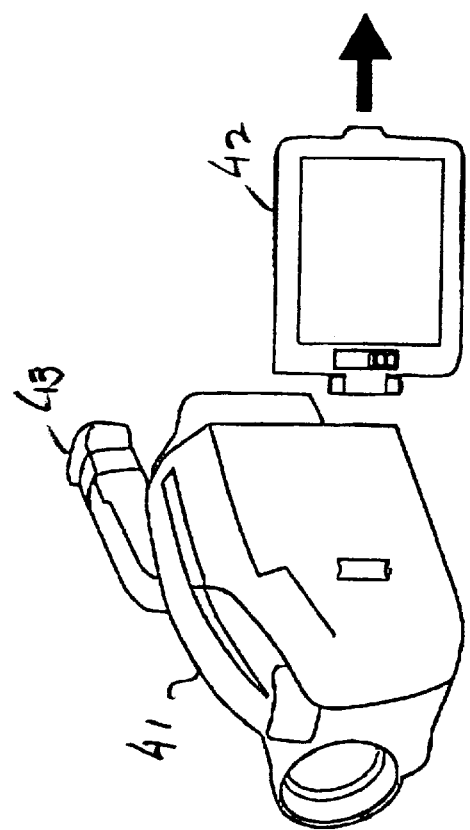
FIGS. 14 and 15 are, pictorial illustrations respectively showing the detachable display connected to and detached from the camcorder.
Figure 14:
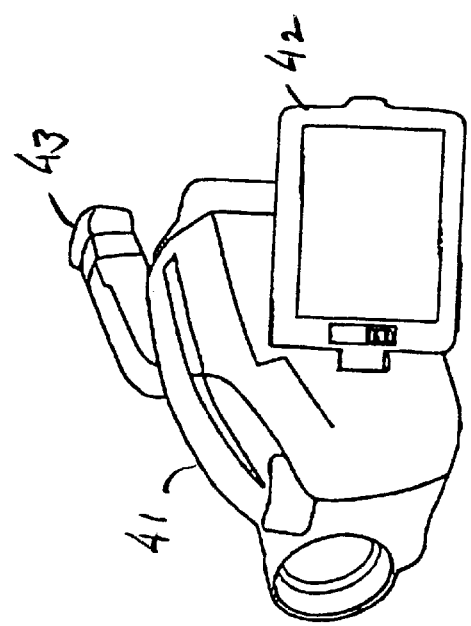

FIG. 13A is an enlarged view of the mechanism by which the detachable display 42 is attached to the camcorder 41. A spring biased sliding toggle 44 is provided for the user to move in the direction of the arrow (upwards as illustrated in the drawing). Doing so, causes the tabs 45 and 46 on connector 47 to retract (as indicated by the arrows associated with each tab), allowing the display connector 47 to be inserted into the corresponding slot 48 on the side of the camcorder. As in the laptop computer described earlier, the tabs 45 and 46 would incorporate electrical connections so that the connector 47 makes both mechanical and electrical connections between the display 42 and the camcorder. FIGS. 14 and 15 which show the detachable display 42 connected to and detached from the camcorder 41.

Figure 17:
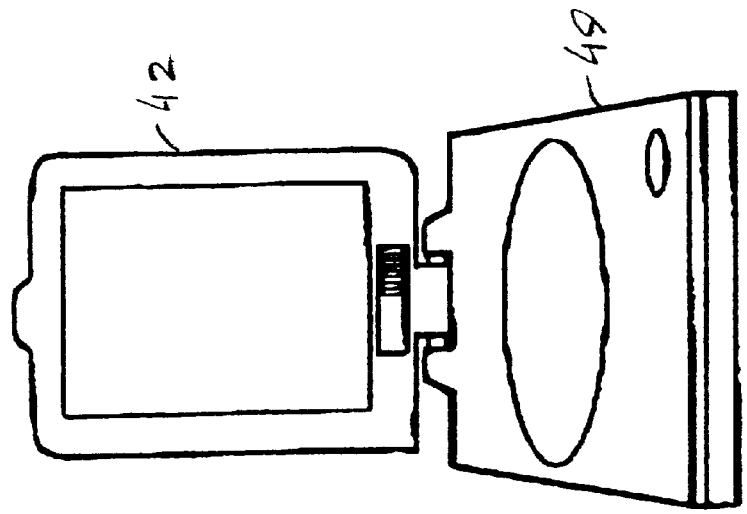
FIG. 17 is a pictorial illustration showing the detachable display attached to the portable video device.
Figure 16:
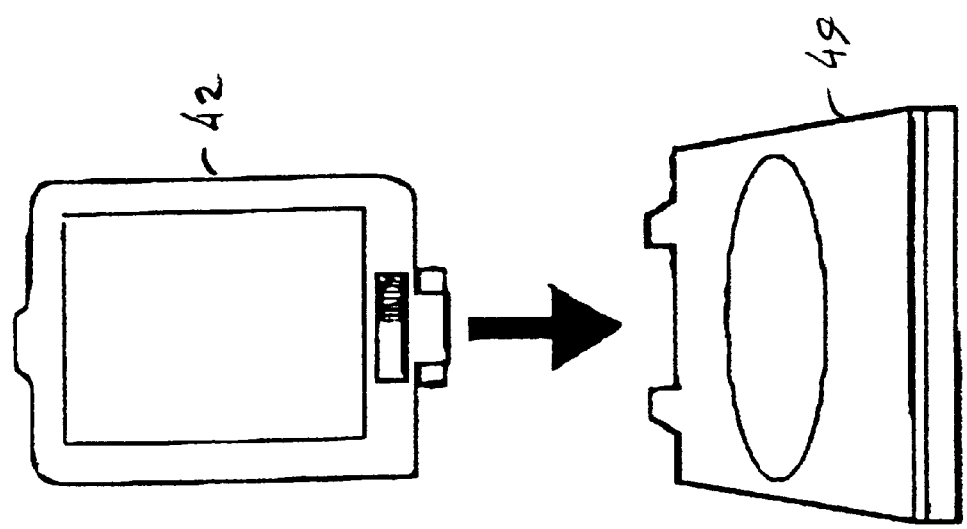
FIG. 16 is a pictorial illustration showing a detachable display for use with a portable video device.

As with the laptop computer, having a detachable display for the camcorder also allows for marketing opportunities, including selling the camcorder and the display separately. This allows consumers to buy the camcorder without a display or be able to select from alternative displays, depending on the user's budget and application. In addition, the display could be adapted to more than one consumer appliance. An example is shown in FIG. 16 is a pictorial illustration showing a detachable display 42 for use with a portable video device 49, such as a DVD player. This display 42 may be interchangeable with display 42 used with the camcorder 41. In FIG. 16, the display 42 is shown detached from the portable video device 49, but as indicated by the arrow, is about to be connected to the portable video device. FIG. 17 shows the detachable display attached to the portable video device.

While the invention has been described in terms of several preferred embodiments, those skilled in the art will recognize that the invention can be practiced with modification within the spirit and scope of the appended claims.

Having thus described our invention, what we claim as new and desire to secure by Letters Patent is as follows:

1. A portable electronic device having a detachable display comprising:

a mechanical connector composed of first and second mating parts mounted on the portable electronic device and the detachable display, the first mating part comprising a cylindrical barrel integral with one of the portable electronic device and the detachable display and the second mating part comprising a slot integral with the other of the detachable display and the portable electronic device into which the first mating part may be inserted;

a retractable hinge pin in one of the first or second mating parts operable by a spring biased sliding toggle, the other of said second or first mating parts having a cylindrical opening for receiving the retractable hinge pin, a physical connection between the portable electronic device and the detachable display and, conversely, a physical disconnection of the portable electronic device from the detachable display being accomplished by manually operating the spring biased sliding toggle so as to retract the hinge pin to either allow the first and second mating parts to be brought into engagement with one another and thereafter releasing the spring biased sliding toggle to allow the retractable hinge pin to extend into the cylindrical opening, thereby establishing a hinged mechanical connection between the portable electronic device and the detachable display, or to allow the first and second mating parts to be disconnected from one another, thereby allowing the detachable display to be removed from the portable electronic device; and an electrical interface providing a detachable electrical connection between the portable electronic device and the detachable display, the electrical interface comprising first electrical connectors within the cylindrical opening and second electrical connectors on the hinge pin, the first electrical connectors making electrical contact with the second electrical connectors when the hinge pin extends into the cylindrical opening, thereby establishing electrical connections are between the electronic device and the detachable display.

2. The portable electronic device as recited in claim 1, wherein the electrical interface additionally is on a mating surface of the male part of the mechanical connector and within a corresponding mating surface of the female part of the mechanical connector such that when the male part of the mechanical connector is brought into engagement with the female part of the mechanical connector, electrical connections are established between the electronic device and the detachable display, allowing a user to use the display attached to portable electronic device without a ribbon cable or detached from the portable electronic device using the ribbon cable.

3. The portable electronic device as recited in claim 2, wherein the portable electronic device is a laptop computer.

4. The portable electronic device as recited in claim 1, the electrical interface comprises:

a cartridge-style plug on one of the portable electronic device and the detachable display; and a cartridge-slot to receive the cartridge-style plug on an opposite one of the detachable display or the portable electronic device.

5. The portable electronic device as recited in claim 4, wherein the cartridge-style plug is hinged.

6. The portable electronic device as recited in claim 1, wherein the portable electronic device is a laptop computer.

7. The portable electronic device as recited in claim 6, wherein the first mating part is a cylindrical barrel integral with the laptop computer and the second mating part is a slot integral with the detachable display, the retractable hinge pin and sliding toggle being part of the detachable display.

8. The portable electronic device as recited in claim 1, wherein the portable electronic device is a camcorder.

9. The portable electronic device as recited in claim 8, wherein the first mating part is a cylindrical barrel integral with the detachable display and the second mating part is a slot integral with the camcorder, the retractable hinge pin and sliding toggle being part of the detachable display.

10. The portable electronic device as recited in claim 1, wherein the portable electronic device is a personal video device.

11. The portable electronic device as recited in claim 10, wherein the first mating part is a cylindrical barrel integral with the detachable display and the second mating part is a slot integral with the personal video device, the retractable hinge pin and sliding toggle being part of the detachable display.

* * * * *